United States Patent [19]

Skarbo et al.

[11] 4,043,882

[45] Aug. 23, 1977

[54] SELECTIVE SOLVENT EXTRACTION PROCESS FOR COPPER FROM NICKEL

[75] Inventors: Roald R. Skarbo, Lexington, Mass.; Hal D. Peterson, Boulder; Edmond A. Morin, Aurora, both of Colo.

[73] Assignee: Kennecott Copper Corporation, New York, N.Y.

[21] Appl. No.: 266,986

[22] Filed: June 28, 1972

[51] Int. Cl.$^2$ .................. C72B 15/10; C72B 23/04
[52] U.S. Cl. .................. 204/106; 204/112; 75/101 BE; 423/24; 423/139
[58] Field of Search .................. 75/101 BE, 117, 119; 423/24, 139; 204/106, 112

[56] References Cited

U.S. PATENT DOCUMENTS

| | | | |
|---|---|---|---|
| 3,224,873 | 12/1965 | Swanson | 75/101 BE |
| 3,276,863 | 10/1966 | Drobnick et al. | 423/139 |
| 3,440,036 | 4/1969 | Spinney | 75/101 R |
| 3,455,680 | 7/1969 | Ashbrook et al. | 75/101 BE |
| 3,674,464 | 7/1972 | Chiola et al. | 75/101 R |
| 3,697,400 | 10/1972 | Pang | 75/101 BE |
| 3,752,745 | 8/1973 | Kane et al. | 75/117 |
| 3,761,249 | 9/1973 | Ritcey et al. | 75/117 |

Primary Examiner—O. R. Vertiz
Assistant Examiner—Brian E. Hearn
Attorney, Agent, or Firm—John L. Sniado; Anthony M. Lorusso

[57] ABSTRACT

The present invention relates to a solvent extraction process for selectively recovering copper from an aqueous solution containing copper and nickel and having a pH above about 9. By employing only limited amounts of oxime, sufficient to provide about equivalent exchangeable hydrogen ion therein to latent copper ion of the aqueous stream, copper ion can be extracted in a multistage countercurrent process preferentially to nickel or cobalt. Hydrogen ion of the oxime molecule exchanges with copper ion in the aqueous solution in accordance with the equation:

$$(2R^oH)org. + (CU^{++})aqu. \rightarrow (R_2{}^oCu)org. + (2H)^+aqu.$$

wherein $R^o$ is the organic moiety of the oxime. The oxime selectively extracts copper when the mole ratio of exchangeable hydrogen ion of the oxime to copper ion in the aqueous is maintained between about 1.8 and 2.4.

7 Claims, 3 Drawing Figures

SELECTIVE SOLVENT EXTRACTION PROCESS FOR COPPER FROM NICKEL

This invention relates to a solvent extraction process for recovering copper selectively from high pH solutions containing nickel and copper.

It is common to use oximes to extract copper selectively from leach solutions containing copper and nickel. However, the prior art has deemed it necessary to conduct the extraction at a pH below about 8.0 to prevent poor selective separation of copper. For example, U.S. Pat. No. 3,224,873 discloses that copper can be extracted from leach solutions having a pH of 9.92 but with leach solutions containing cobalt and nickel, a maximum pH of about 4.59 is shown to be necessary to obtain selective copper extraction.

Recently it has been proposed to employ leaching solutions of an ammonium salt in aqueous ammonia to recover the copper and nickel values from manganese deep sea nodules, thereby producing a metal-loaded leach solution having a pH of about 9 or above. Present extraction processes would require the metal-loaded leach solution to be treated to lower its pH prior to oxime extraction. This is undesirable since the reagents required to lower the pH could result in undesirable precipitation of the metal values therefrom and would in any event increase both processing and maintenance costs.

As used herein, the terms, "first extraction stage" or "first stage" refers to the stage in a multi-stage extraction process wherein metal-loaded leach solution first is contacted with an organic solution containing an extractant for copper. The terms "last extraction stage" or "last stage" refers to the stage in a multi-stage extraction process wherein fresh organic extractant is contacted first with a metal-containing leach solution and wherein copper-depleted leach solution is removed from the extraction process. The remaining stages in the extraction process are referred to herein as the "intermediate stages."

The present invention is based upon the discovery that when an ammoniacal leach solution having a pH above about 9 and containing copper and nickel is admixed with an organic stream comprising an oxime in a water-immiscible organic solvent, nickel concentration in the organic stream, as a function of copper concentration in the aqueous stream, reaches a maximum and then is reduced to about zero as the copper concentration in the organic stream is increased to approach the capacity of the oxime for retaining metal ion. Furthermore, in the same system, the concentration of copper in the organic stream in equilibrium with copper in the aqueous stream does not pass through a maximum and then decrease as a function of copper concentration in the aqueous stream but continues to increase up to the capacity of the oxime for retaining metal ion. This phenomenon is observed regardless of whether the leach solution contains other metals such as cobalt. Thus by controlling the concentration of copper in the organic stream, it is possible to exclude nickel from the organic stream.

Based upon this discovery, the metal-loaded leach solution is contacted countercurrently with an organic solution containing an oxime extractant in a plurality of stages at a relatively low volumetric ratio of organic oxime stream to aqueous stream so that a mole ratio of exchangeable hydrogen ion of the oxime in the fresh oxime stream to the last stage to copper ion in the fresh aqueous stream to the first stage is maintained between 1.8 and 2.4, as defined by equation I below. At these mole ratios, for a given copper concentration in the aqueous stream, substantially all the capacity of the oxime for metal ion in the first extraction stage is taken up by copper to the exclusion of nickel. At least one additional extraction stage is employed to remove substantially all the copper in the aqueous stream. During contact of the high pH aqueous solution and the oxime, copper ion in the aqueous stream is exchanged for hydrogen ion in the organic stream in accordance with equation I.

$$(2R^oH)_{org.} + (Cu^{++})_{aqu.} \rightarrow (R_2^oCu)_{org.} + (2H^+)_{aqu.} \qquad \text{(Eq. 1)}$$

wherein $R^o$ is the organic moiety of the oxime extractant. It is believed that the copper ion forms a chelate with the oxime molecule.

The range of operable mole ratios of exchangeable hydrogen ion of the oxime to copper ion in the fresh aqueous stream for a given aqueous stream containing copper and nickel can be determined from extraction equilibrium curves which define the concentration of copper and/or nickel in the organic stream as a function of copper concentration in the aqueous stream, and from an operating line chosen to define an organic stream to aqueous stream volume ratio such that the copper mole ratio of the exchangeable hydrogen ion in the oxime to the copper ion in the aqueous stream are maintained within the mole ratios set forth above.

The oxime stream has a greater affinity for copper than for nickel when admixed with the metal-loaded aqueous steam. In each extraction stage, copper and nickel in the oxime stream are in equilibrium with copper and nickel in the aqueous stream in accordance with Equation II.

Equation II

The copper and nickel concentration in the oxime stream depends upon the equivalents of exchangeable hydrogen ion available therein and the equivalents of exchangeable copper ion in the aqueous stream. When the equivalents of hydrogen ion available in the oxime stream exceeds the equivalents of copper ion in the aqueous stream, the excess hydrogen ion will exchange with available nickel ion in the aqueous stream. This nickel ion transfer occurs in the last extraction stage and usually the intermediate extraction stage immediately adjacent the last stage since the copper ion equivalent in the aqueous stream has been reduced by virtue of prior contact of the oxime and aqueous stream in the first stage and any other intermediate stages. Thus, the oxime in the last stage has the capacity to exchange preferentially with substantially all of the copper ion in the aqueous stream as well as some of the nickel therein. However, the equilibrium of Equation II is shifted as the oxime stream containing copper and nickel is contacted with the aqueous stream in the first stage and intermediate stages adjacent the first stage since the aqueous stream in these stages contains more equivalents of copper ion. By virtue of the oxime's preferential affinity for copper, the copper in the aqueous stream in the first stage and intermediate stage adjacent thereto will be extracted into the oxime stream by displacement of an equivalent amount of nickel. In the extraction process, the mole ratio of exchangeable hydrogen ion in the fresh oxime stream to exchangeable copper ion in the fresh aqueous stream is regulated so that the capacity of the oxime for nickel or copper does not significantly exceed the equivalents of copper ion available in the aqueous stream. Thus in the first stage, i.e. the final stage where the oxime stream is contacted with the aqueous stream, substantially all of the copper is exchanged into the oxime stream in preference to nickel and the oxime stream does not have additional capacity for nickel.

The copper-nickel ratio in the organic stream can be improved, i.e., be made larger, by removing as much of the residual nickel as possible from the copper-loaded organic before the copper is stripped from the copper-loaded organic. This can be accomplished by providing one or more nickel scrubbing steps. A portion of the copper-nickel barren leach solution from the nickel extraction step is used to scrub the copper-loaded organic prior to the copper-loaded organic entering the copper stripping step. The remaining portion of the copper-nickel barren leach solution may be recycled to a leaching step to leach copper and nickel from an ore. By improving the copper-nickel ratio less nickel will enter the copper electrowinning circuit and thus lower the bleed stream requirement from the latter circuit.

The minimum number of extraction stages to effect removal of substantially all the copper and the operating line can be determined such as by the method described in "Unit Operations of Chemical Engineering", McCabe and Smith, published by McGraw-Hill Book Company, Inc., 1956 pages 598 to 604. By operating according to the present invention substantially all of the copper can be recovered selectively from a leach solution containing nickel and copper and having a pH above about 9 without a prior treatment of the leach solution.

Any conventional extraction apparatus can be employed in the process of this invention including mixer-settlers, centrifugal separators or the like. These apparatus provide means for first intimately mixing the incoming streams to each stage, allowing the two immiscible phases to separate and then drawing the two phases from the stage each to a different stage to effect overall countercurrent flow of the two phases.

Figure 1:
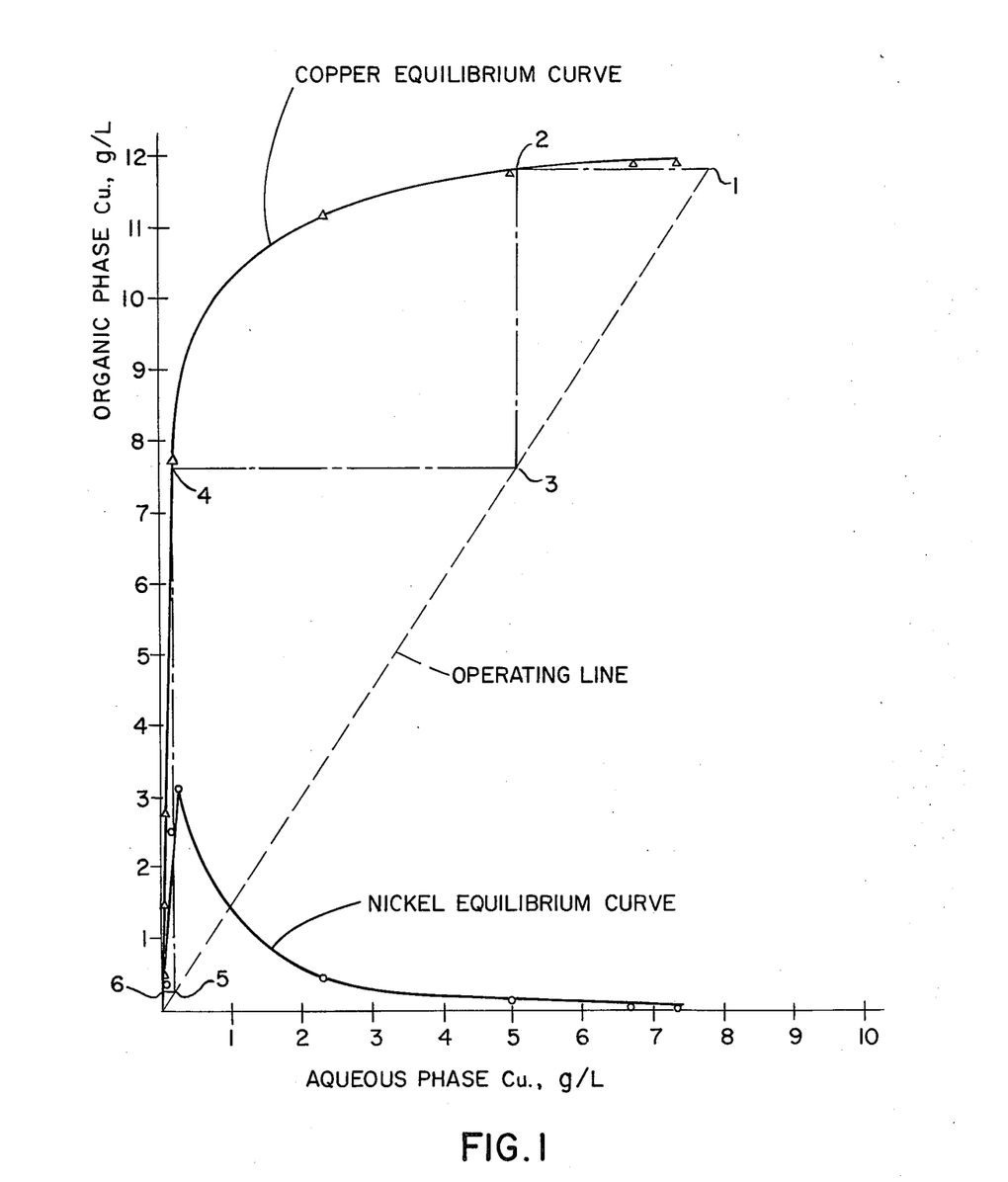
FIG. 1 shows a typical set of extraction equilibrium curves and an operating line for obtaining selective copper extraction in a multi-stage countercurrent extraction process.

The operation of the present invention will be more fully described with reference to FIG. 1. The curves shown in FIG. 1 are the extraction equilibrium curves for copper and nickel extracted from an ammonia-ammonia carbonate leach solution having a 10.1 pH and containing 7.89 g/l copper, 5.79 g/l nickel and 0.33 g/l cobalt and an organic stream comprising 40 volume percent LIX-64N dissolved in kerosene. The data for the equilibrium curves are obtained by equilibrating the organic reagents and the aqueous feed solution at different volume ratios and, for each organic to aqueous ratio, measuring the copper, nickel and cobalt concentrations of the two phases. The metal concentrations of the organic phase are plotted as a function of the copper concentrations in the aqueous phase. As shown in FIG. 1, no cobalt was extracted into the organic phase.

As shown by the nickel equilibrium curve, when nickel is extracted in the presence of copper, nickel content in the organic phase decreases to essentially zero under conditions of substantially complete copper loading of the organic phase. This surprising result establishes that it is possible to extract copper selectively with LIX-64N when the first stage of the extraction process, wherein fresh aqueous feed is introduced and loaded organic is removed from the extraction step for subsequent processing, is operated under conditions such that little or no copper extraction is effected therein.

This desired result is obtained by choosing a suitable organic to aqueous volume ratio, as defined by the operating line, which effects extraction in the last and intermediate stages so that the organic stream entering the first extraction stage contains little or no nickel. As shown in FIG. 1, the operating line is defined by the point 0,0 and by the point 1 defined by the copper concentration in incoming fresh leach solution to the first stage and the desired copper concentration in the final organic stream removed from the first stage. In this case, the copper concentration in the incoming aqueous feed is 7.89 grams per liter copper and the desired copper concentration in the organic feed of 11.8 grams per liter, which is slightly below the maximum capacity for the LIX-64N solution used of 12 grams per liter. The volume ratio of aqueous stream to organic stream in this case defined by the slope of the operating line 1.49 or a volume ratio of organic stream to aqueous stream of 0.67. These volume ratios are controlled by controlling the rate of flow of the two streams in the extraction process. Once the extraction equilibrium curves and the operating line have been determined, the minimum number of extraction stages to be used is determined. The operating line defines the relationship between the copper concentration in the incoming aqueous stream of a given extraction stage and the copper concentration in the organic outlet stream in the same stage. Since the extraction stages are considered ideal, the copper concentration of the organic stream leaving each extraction stage must be in equilibrium with the aqueous stream leaving the same extraction stage.

Figure 2:
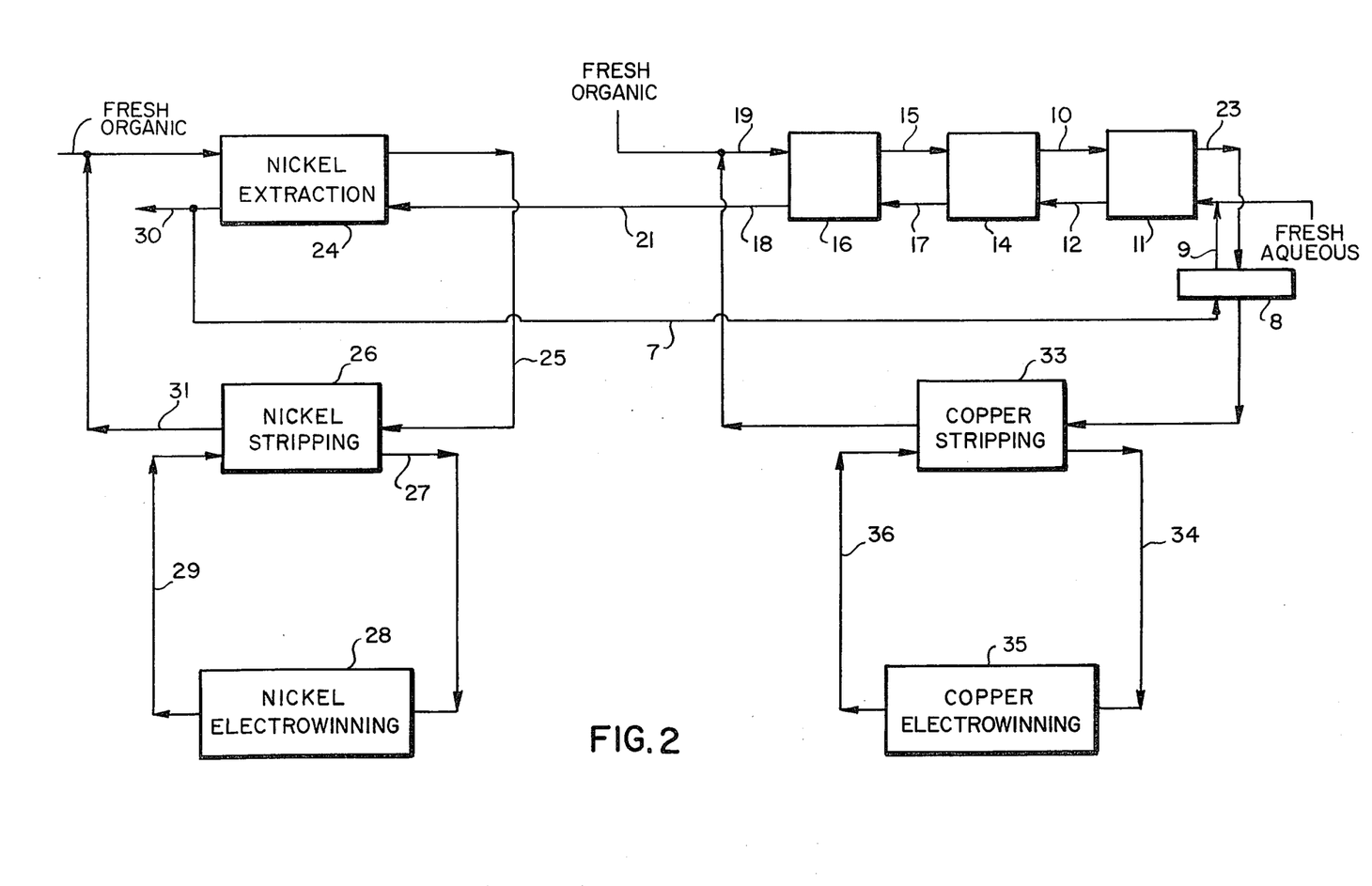
FIG. 2 is a schematic diagram of a typical process for extracting copper in accordance with the present invention.

Referring to FIGS. 1 and 2, point 2 of the equilibrium curve represents the copper concentration of both the organic stream 10 after being mixed in the first extraction stage 11 and the aqueous raffinate stream 12 removed from the first extraction stage 11. The organic stream having the copper concentration represented by 2 contains about 0.2 g/l nickel. Point 3 on the operating line represents the copper concentration in the aqueous stream from the first stage 11 and the copper concentration in the organic outlet stream 10 from the second stage 14. Point 4 on the copper equilibrium curve represents the copper concentration in the organic stream 10 from the second stage 14, and the copper concentration in the aqueous raffinate stream 17 removed from the second stage 14. Point 5 on the operating line represents the copper concentration of the aqueous raffinate stream 17 and the copper concentration of the organic stream 15 out of the last stage 16. The organic streams defined by points 4 and 6 contain nickel as well as copper in an amount of about 2 g/l and 0.2 g/l respectively. The copper concentration in the aqueous raffinate stream 18 out of the last extraction stage 16 and in the organic stream 19 after being mixed in stage 16 is defined by point 6 on the copper equilibrium curve. Since the copper concentration of the aqueous stream out of extraction stage 16 is substantially zero, no further extraction stages need be added in this case. However, if desired, an additional extraction stage could be provided with copper concentrations for the various inlet and outlet streams being defined in accordance with the method described herein.

Further referring to FIG. 2, the copper-loaded organic stream 23 recovered from the first extraction stage 11 and the nickel-loaded, copper-barren aqueous raffinate stream 18 each can be treated further to recover pure nickel or pure copper. The nickel-rich stream 18 is directed to an extraction step 24 wherein it contacts countercurrently an organic stream containing an oxime extractant in a plurality of stages. The nickel-barren aqueous stream 30 can be recycled to a leaching step (not shown) to leach copper and nickel from an ore. The conditions under which an oxime extracts nickel from a high pH aqueous leach solution are known in the art and need not be discussed in detail herein. The nickel-loaded organic stream 25 then is directed to a stripping step 26 wherein it is contacted countercurrently in a plurality of stages with an acid solution such as aqueous sulfuric acid under conditions of pH and volumetric ratio of aqueous stream to organic stream such that hydrogen ion in the aqueous stream is exchanged with substantially all of the nickel ion which is bound in the oxime molecule in chelate form. Specific stripping conditions for removing nickel from the organic stream by acid stripping are well known in the art as are the conditions for removing copper by stripping with an acid stream which is discussed below.

The nickel-rich aqueous stream can be treated further to recover pure nickel therefrom such as an electrowinning step from which the nickel-barren aqueous stream can be recycled to the stripping step 26. The electrowinning step usually is conducted in the presence of a buffer such as boric acid to maintain pH condition in the electrowinning step to assure formation of nickel cathodes with little or no precipitation of nickel compounds.

As previously indicated the copper-nickel barren aqueous stream 30 can be recycled to a leaching step (not shown). It is preferred, however, to direct a portion of the copper-nickel barren aqueous stream 7 to one or more nickel scrubbing steps, 8, wherein any residual nickel remaining in the copper-loaded organic stream 23 is removed prior to the copper stripping step. This procedure improves the copper to nickel ratio in the copper-loaded organic stream entering the copper stripping step 33 by decreasing the amount of nickel in the copper electrowinning circuit 35. The stream 9 containing any residual nickel removed from the scrubbing step or steps 8 is reintroduced into stage 11 with fresh aqueous stream where the nickel eventually finds its way into the nickel extraction circuit.

The copper-rich organic stream 23 is directed to a copper-stripping step 33 wherein it is countercurrently contacted in a plurality of stages with an aqueous acid solution such as sulfuric acid under conditions of pH and volumetric ratio of organic stream to aqueous stream to exchange hydrogen ion of the acid with copper ion bound by the oxime molecule and which forms a chelate therewith. The copper-loaded acid stream 34 then is directed to a copper recovery step 35, such as an electrowinning step to recover pure copper therefrom.

The copper-depleted acid stream 36 can be recycled to the copper-stripping step 33.

Figure 3:
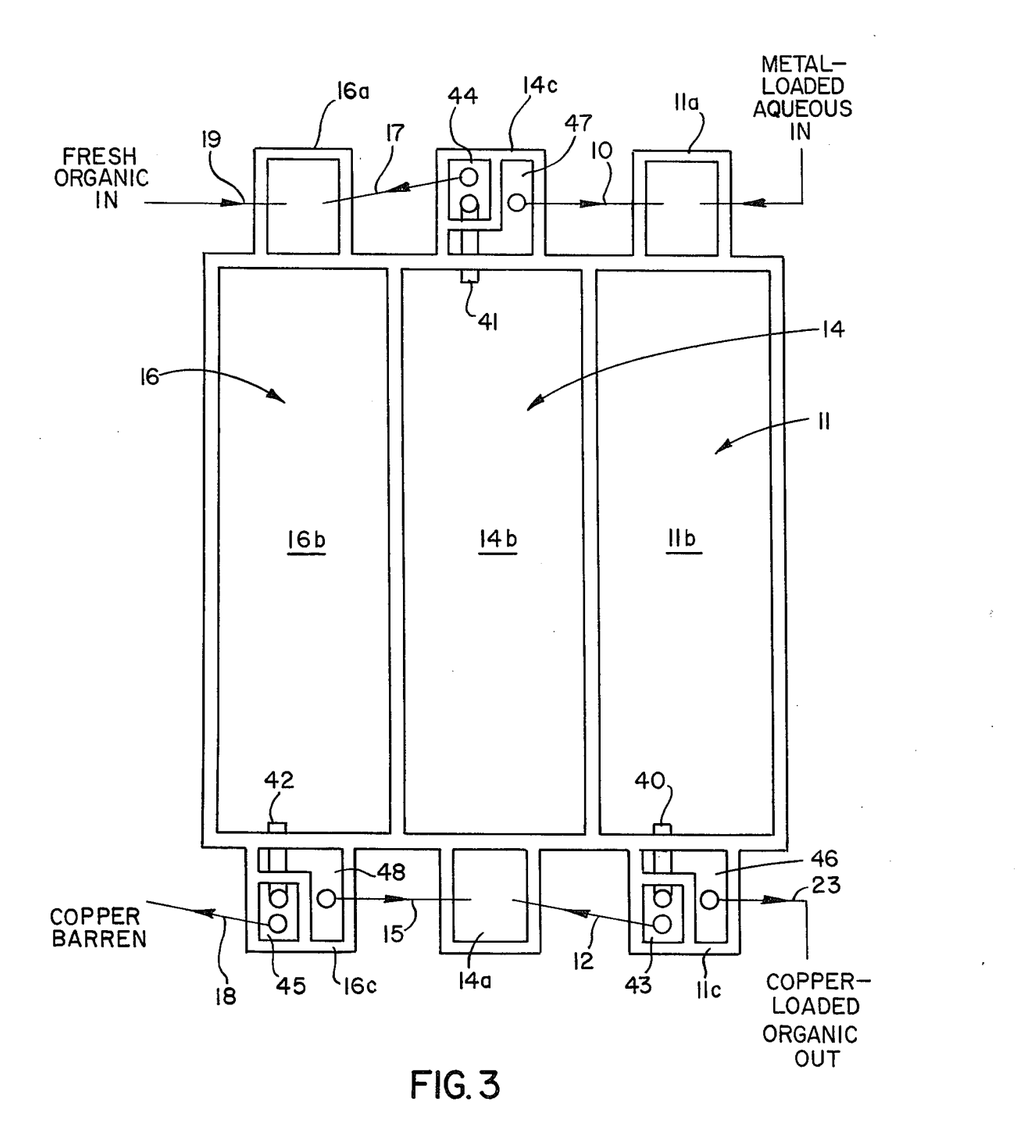
FIG. 3 is a plan view of three extraction stages that can be employed in the present process.

Referring to FIG. 3, each extraction stage 11, 14 and 16 has a mixing section, 11a, 14a and 16a respectively, a settling section 11b, 14b and 16b respectively and a liquid removal section 11c, 14c and 16c respectively. The liquid streams are transferred to each mixing section 11a, 14a and 16a and from each removal section 11c, 14c and 16c and to and from each settling stage 11b, 14b and 16b by pumping means (not shown).

Initially, an organic stream and aqueous stream are introduced into each mixing section 11a, 14a and 16a. Mixing is effected in each stage concomitantly as are settling and subsequent liquid removal. The liquid streams are pumped into the mixing section either from the next adjacent downstream removal section or as a fresh organic stream or fresh aqueous stream. Thus, the fresh, metal-loaded, aqueous stream and organic stream 10 are introduced into mixing section 11a; aqueous stream 12 and organic stream 15 into mixing section 14a and aqueous stream 17 and fresh organic into mixing section 16a. After the liquids have been adequately mixed they overflow into the adjacent settling section 11b, 14b and 16b and allowed to separate into two phases with the organic phase floating on the aqueous phase. The aqueous phase is removed from settling sections 11b, 14b and 16b by means of a conduit 40, 41 and 42 respectively, connecting the lower portion of the settling section with an aqueous retaining portion 43, 44 or 45 respectively in the removal sections. The organic stream is removed from each settling section through a conduit connecting the upper portion of each settling section and an organic retaining portion 46, 47 or 48 of the removal sections 11c, 14c and 16c respectively.

Suitable organic extractants which can be employed in the present invention are those which, when mixed with a leach solution having a pH above about 9 and containing copper and nickel, causes the concentration of nickel in the oxime stream in equilibrium with the nickel in the aqueous stream to reach a maximum and then causes the nickel to be displaced by copper as the copper concentration in both the aqueous and the organic streams is increased.

The oximes referred to herein may be for example α-hydroxy oximes, substituted hydroxy benzophenoximes, and mixtures thereof.

The α-hydroxy oxime component has the general formula where R, R' and R" may be any of a variety of organic hydrocarbon radicals such as aliphatic and alkylaryl radicals. R" may also be hydrogen. Preferably, R and R' are unsaturated hydrocarbon or branched chain alkyl groups, containing from about 6 to 20 carbon atoms, R and R' are also preferably the same and, when alkyl, are preferably attached to the carbons substituted with the —OH and =NOH groups through a secondary carbon atom. It is also preferred that R" is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5-10- diethyl-8-hydroxy-tetradecan-7-oxime, and 5,8-diethyl-7-hydroxy-dodecane-6-oxime. The latter compound has the following structural formula:

Representative of other mono- and polyunsaturated radicals are heptenyl, octenyl, decenyl, octadecenyl, and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The α-hydroxy oximes are prepared by reacting an acyloin with a hydroxylamine salt under reflux conditions. Such reaction can be carried out by refluxing the reactants in an alcohol such as ethanol and adding pyridine to combine with the acid associated with the hydroxylamine.

The substituted benzophenoximes useful in the present invention have the following formula:

in which R and R' may be individually alike or different and are saturated aliphatic groups, ethylenically unsaturated aliphatic groups or saturated or ethylenically unsaturated aliphatic ether groups (i.e. — OR") and m and n are 0, 1, 2, 3 or 4 with the proviso that m and n are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atoms on the other aromatic nucleus are unsubstituted. Branched chain saturated aliphatic hydrocarbon substituents are preferred. Compounds of the above type useful in the present invention include the following:

2-hydroxy-3'-methyl-5-ethylbenzophenoxime
2-hydroxy-5-(1,1-dimethylpropyl)-benzophenoxime
2-hydroxy-5-(1,1-dimethylethyl) benzophenoxime
2-hydroxy-5-octylbenzophenoxime
2-hydroxy-5-nonly-benzophenoxime
2-hydroxy-5-dodecyl-benzophenoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl-5-(2-pentyl)-benzophenoxime
2-hydroxy-4'-(1,1-dimethylethyl-5-(2-butyl-enzophenoxime
2-hydroxy-4-dodecyloxybenzophenoxime
2-hydroxy-4'-(1,1-dimethylethyl)-5-methyl-benzophenoxime
2-hydroxy-4',5-bis-(1,1-dimethylethyl)benzophenoxime It has been found that when the α-hydroxy aliphatic oximes are employed in combination with the 2-hydroxy benzophenoximes described the extractions are improved.

The α-hydroxy aliphatic oxime extractants which may be used for this purpose have the following general formula:

where $R^1$, $R^2$ and $R^3$ may be any of a variety of organic radicals such as aliphatic and alkylarly radicals. $R^3$ may also be hydrogen. Preferably, $R^1$ and $R^2$ are unsaturated hydrocarbon or branched chain alkyl groups containing from about 6 to 20 carbon atoms. $R^1$ and $R^2$ are also preferably the same and when alkyl are preferably attached to the carbons substituted with the —OH and =NOH groups through a secondary carbon atom. It is also preferred that $R^3$ is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5,10-diethyl-8-hydroxytetradecan 7-oxime, and 5,8--diethyl-7-hydroxydodecane-6-oxime. The latter compound has the following structural formula:

Representative of other mono-polyunsaturated radicals are heptenyl, octenyl, decenyl, octadenenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like. The $R^1$, $R^2$ and $R^3$ groups may contain inert substituents.

The relative amounts of the two extractants in the compositions of the present invention can be varied widely as examples hereinafter will demonstrate. Even minute quantities of the α hydroxy aliphatic oxime are beneficial. However, it is preferred to employ it in the range of 1 to 100% by weight based on the weight of the 2-hydroxy benzophenoxime, with best results obtainable in the range of 15–50%. The amount of the extractants in the organic solvent likewise can vary within considerable limits. In general, however, the concentration of total oxime is in the range 2–25%, based on the weight of the organic extracting solution, preferably in the range of 5–15%.

These and other suitable oximes are disclosed for example by U.S. Pat. Nos. 3,224,873, 3,592,775, 3,455,680, 3,428,499, 3,276,863 and 3,197,274.

The following examples illustrate the present invention and are not intended to limit the same.

TABLE I

Analytical Profile Data for a Continuous Countercurrent Multi-Stage Circuit on Copper-Nickel Extraction Efficiency (40 v/v% LIX-64N in Kerosene)

Low Flow Rates (63.5 ml per minute (O/A = 0.695)

| Stage No. | g/l Copper Aqueous | g/l Copper Organic | % Cu Extracted in each Stage (Cumulative) | g/l Nickel Aqueous | g/l Nickel Organic | Cu to Ni Ratio |
|---|---|---|---|---|---|---|
| Ext. E-1 (Loaded Organic out and Feed in) | 4.46 | 11.40 | 43.47 | 7.79 | 0.55 | 20.7 |
| Ext. E-2 | 0.37 | 6.37 | 95.31 | 10.56 | 3.41 | — |
| Ext. E-3 | 0.077 | 0.48 | 99.09 | 9.47 | 7.40 | — |
| Ext. E-4 (Barren Organic in and Raffinate out) | 0.036 | 0.060 | 99.54 | 5.42 | 5.83 | — |
| High Flow Rates (100 ml per minute) (O/A = 0.666) | | | | | | |
| Ext. E-1 | 7.51 | 12.21 | 4.81 | 6.11 | 0.21 | 58.1 |
| Ext. E-2 | 5.77 | 11.27 | 26.86 | 7.07 | 0.69 | — |
| Ext. E-3 | 1.41 | 8.65 | 82.13 | 8.88 | 2.13 | — |
| Ext. E-4 | 0.011 | 2.11 | 99.86 | 5.65 | 4.85 | — |
| High Flow Rates (100 ml per minute) (O/A = 0.625) | | | | | | |
| Ext. E-1 | 7.89 | 12.57 | Nil | 5.84 | 0.10 | 125.7 |
| Ext. E-2 | 7.86 | 12.52 | 0.38 | 5.87 | 0.12 | — |
| Ext. E-3 | 7.24 | 12.16 | 8.24 | 6.19 | 0.17 | — |
| Ext. E-4 | 0.72 | 10.37 | 90.87 | 5.724 | 0.68 | — |
| Feed Solution | 7.89 | — | — | 5.79 | — | — |

EXAMPLE I

An acrylic, box-type mixer-settler circuit consisting of four extraction stages was assembled. This circuit was used for three experimental runs, all of which were made with 40 volume % LIX-64N in kerosene as the organic extractant. The aqueous solution contained 7.89 g Cu, 5.79 g Ni, 0.33 g Co, and 128 g $NH_3$ (total) per liter, and had a pH of 10.1. It was prepared by leaching a portion of reduced manganese nodules with an $NH_4OH/(NH_4)_2CO_3$ solution.

The first test was performed at a total flow rate of 63.5 ml/min. with an organic to aqueous volume ratio of 0.695. The second test was performed at a higher flow rate of 100 ml/min. with an organic to aqueous volume ratio of 0.666. In the third test a 100 ml/min. total flow rate was again used, with an organic to aqueous volume ratio of 0.625. The retention time in the mixer cells was approximately 1.2 and 2.0 minutes for the high and low flow rates, respectively.

For each test, a countercurrent extraction circuit with four stages was operated continuously until equilibrium has been reached and organic and aqueous samples were taken from the four settler compartments of the circuit. All samples were subsequently analyzed for Cu and Ni. The analytical results were used to calculate the percentage of Cu extracted after each stage, as well as the Cu:Ni ratio of the organic leaving the first extraction stage. The experimental and calculated results of the three tests are summarized in Table 1.

The results given in Table 1 shows that substantially all the copper can be extracted selectively from an ammoniacal Cu-Ni leach solution with a pH higher than 9.0 by multistage contacting of the aqueous feed with LIX-64N. The results also show that no nickel is extracted in the first stage of the extraction circuit.

EXAMPLE II

This example illustrates the use of LIX-63 for selective extraction of Cu from an ammoniacal leach solution with a pH of 10.1 and containing 7.89 g. Cu, 5.79 g Ni, 0.33 g Co., and 128 g $NH_3$ (total) per liter. The organic stream comprised 12 volume % LIX-63 in kerosene.

The organic and aqueous feed solutions were fed countercurrently to a four-stage mixer-settler extraction unit, operated under the following experimental conditions:

| | |
|---|---|
| Organic feed rate: | 42.5 ml/min. |
| Aqueous feed rate: | 57.5 ml/min. |
| Organic/aqueous volume ratio: | 0.740 |
| Contact Time per Stage: | 2 minutes |

The extraction unit was operated continuously and organic and aqueous samples from the four settler compartments of the circuit were taken when it had reached equilibrium. All samples were analyzed for Cu and Ni. The analytical results were used to calculate the percentage of Cu extracted after each stage, as well as the Cu:Ni ratio of the organic leaving the first extraction stage. The experimental and calculated results of Table II show that 98.86% of the incoming copper can be extracted and that the Cu to Ni weight ratio in the final extraction stream was 273.3. This shows that essentially all of the copper can be extracted selectively with LIX-63 from high pH leach solution containing significant nickel concentrations.

TABLE II

Analytical Profile Data of a Continuous Countercurrent Multi-State Circuit (12 v/v% LIX-63 in Kerosene)

| Stage No. | g/l Copper Aqueous | g/l Copper Organic | % Copper Extracted in each Stage (Cumulative) | g/l Nickel Aqueous | g/l Nickel Organic | Cu to Ni Ratio |
|---|---|---|---|---|---|---|
| Ext. E-1 (Metal Loaded Organic out and Feed in) | 3.18 | 10.66 | 59.70 | 5.83 | 0.039 | 273.3 |
| Ext. E-2 | 1.01 | 4.20 | 87.20 | 5.87 | 0.087 | — |
| Ext. E-3 | 0.39 | 1.27 | 95.06 | 5.90 | 0.15 | — |
| Ext. E-4 (BaRREN Organic in and Raffinate out) | 0.09 | 0.43 | 98.86 | 5.76 | 0.19 | — |

EXAMPLE III

This example was essentially identical to that of Example II, except that 20 volume % LIX-64N in kerosene was used rather than LIX-63, and the organic and aqueous feed rates were adjusted to 58.5 and 41.5 ml/min. respectively. The results summarized in Table III show that copper can be extracted selectively from high pH leach solutions containing significant nickel concentration.

TABLE III

| Stage No. | g/l Copper Aqueous | g/l Copper Organic | % Copper Extracted in each Stage (Cumulative) | g/l Nickel Aqueous | g/l Nickel Organic | Cu to Ni Ratio |
|---|---|---|---|---|---|---|
| Ext. E-1 | 7.57 | 5.65 | 4.06 | 5.82 | 0.04 | 141.3 |
| Ext. E-2 | 5.04 | 5.41 | 36.12 | 6.58 | 0.13 | — |
| Ext. E-3 | 0.91 | 3.59 | 88.47 | 7.49 | 0.67 | — |
| Ext. E-4 | 0.01 | 0.64 | 99.87 | 5.734 | 1.32 | — |

EXAMPLE IV

This example illustrates the use of copper and nickel barren leach solution for scrubbing the copper-loaded oxime to remove any residual nickel contained therein. A multistage countercurrent mixer-settler unit was assembled consisting of a copper circuit with four extraction, two Ni scrub, and five Cu strip stages, and a nickel circuit with four extraction, and five Ni strip stages. All scrubbing and stripping stages had calibrated flowmeters in recycle lines to regulate the flow of aqueous solution. Immersion heaters were installed in the stripping stages to maintain a temperature of about 45° C.

Aqueous feed solution was introduced to the first extraction stage of the copper circuit. The feed solution was obtained by ammoniacal leaching of reduced manganese nodules and contained 8.3 g Cu, 5.77 g Ni, 65 g $NH_3$ (total), and 48 g $CO_2$ per liter.

Organic feed solution was introduced from separate reservoirs to the fourth extraction stage of the respective circuits. The organic used was 20 volume % LIX-64N in kerosene.

The Cu barren leach solution leaving the copper circuit was fed to the first extraction stage of the nickel circuit. After extraction of Ni, a portion of the resulting Cu-Ni barren leach solution was used as feed to the Ni scrub circuit. The aqueous underflow from the latter circuit was fed back to the copper extraction circuit and admixed with the fresh aqueous feed solution (pregnant leach solution). The copper circuit flow rates were as follows:

| | Input Flow Rates (ml/min) | Aqueous Recycle Rates (ml/min) |
|---|---|---|
| Organic Feed Rate | 58 | — |
| Aqueous Feed Rate (total) | 46 | — |
| Nickel Scrubber | 3 | 35–40 |
| Strip Solution | 30 | 20–25 |

TABLE IV

Analytical Profile Data of Copper Circuit

| Cell No. | gpl Copper Aqueous | gpl Copper Organic | gpl Nickel Aqueous | gpl Nickel Organic | % Cu Extracted | % Cu Stripped | Cu to Ni Ratio |
|---|---|---|---|---|---|---|---|
| Ext E-1 | 7.85 | 6.61 | 5.42 | 0.059 | 1.88 | — | 112.0 |
| Ext E-2 | 7.67 | 6.48 | 5.77 | 0.093 | 4.13 | — | — |
| Ext E-3 | 5.02 | 6.04 | 7.19 | 0.37 | 37.25 | — | — |
| Ext E-4 | 0.052 | 3.94 | 5.38 | 1.50 | 99.35 | — | — |
| Ni Scrubber - 1 | 4.62 | 6.46 | 0.80 | 0.038 | — | 2.27 | 170.0 |
| Ni Scrubber - 2 | 2.25 | 6.36 | 0.39 | 0.023 | — | 3.78 | 276.5 |
| Strip S-1 | 45.47 | 1.40 | 0.036 | 0.006 | — | 77.99 | 346.4 |
| Strip S-2 | 34.96 | 0.76 | 0.004 | 0.006 | — | 88.05 | — |
| Strip S-3 | 33.72 | 0.50 | 0.004 | 0.004 | — | 92.14 | — |
| Strip S-4 | 33.22 | 0.44 | 0.004 | 0.004 | — | 93.08 | — |
| Strip S-5 | 33.10 | 0.39 | 0.004 | 0.004 | — | 93.87 | — |

We claim:

1. A process for selectively extracting copper from an aqueous ammoniacal solution containing copper and nickel and having a pH above about 9 which comprises contacting said aqueous solution with a water-immiscible organic oxime extractant in a plurality of extraction stages to effect copper ion transfer from the aqueous solution to the oxime extractant and hydrogen ion transfer from the oxime extractant to the aqueous solution in accordance with the equation:

$$(2R^oH)_{organic} + (Cu^{++})_{aqueous} \rightarrow (R^o_2Cu)_{organic} + (2H^+)_{aqueous},$$

where $R^o$ is the organic moiety fo the oxime, said solution and extractant being flowed countercurrently between stages, the mole ratio of exchangeable hydrogen ion in the oxime extractant, prior to contact with the aqueous solution, to copper ion in the aqueous solution, prior to contact with the oxime extractant, being maintained between about 1.8 and 2.4.

2. The process of claim 1 wherein the aqueous ammoniacal solution comprises an aqueous solution of ammonia and ammonium carbonate.

3. A process for extracting nickel and copper from an ammoniacal aqueous solution having a pH above about 9 which comprises:
  a. contacting said aqueous ammoniacal solution in a plurality of extraction stages, including a first extraction stage and a last extraction stage, with a water-immiscible organic oxime extractant to effect copper ion transfer from the aqueous solution to the oxime extractant and hydrogen ion transfer from the oxime extractant to the aqueous solution in accordance with the equation:

$$(2R^oH)_{organic} + (Cu^{++}) \text{ aqueous} \rightarrow RR^o_2Cu)_{organic} + (2H^+) \text{ aqueous}$$

where $R^o$ is the organic moiety of the oxime, said solutions and extractant being flowed countercurrently between stages, the mole ratio of exchangeable hydrogen ion in the oxime extractant, prior to contact with the aqueous solution, to copper ion in the aqueous solution prior to contact with the oxime extractant, being maintained between about 1.8 and 2.4;
  b. contacting the copper-barren, nickel-rich aqueous solution which results from step (a) with an oxime extractant to load the nickel in the aqueous solution onto this extractant; and
  c. recovering nickel from the nickel loaded oxime extractant and copper from the copper loaded oxime extractant.

4. The process as set forth in claim 3 wherein the oxime extractant of step (a) is introduced into said plurality of extraction stages at the last extraction stage, the aqueous ammoniacal solution is introduced into said plurality of stages at the first extraction stage, the copper loaded extractant exits from said first stage and the nickel rich aqueous exits from said last stage.

5. The process of claim 4 wherein said copper loaded extractant exiting from the first extraction stage is contacted with the nickel-barren aqueous solution of step (b) to remove any residual nickel present on said copper loaded oxime extractant.

6. The process of claim 5 wherein said nickel-barren aqueous solution after contact with said copper loaded oxime extractant is fed into said first extraction stage.

7. The process of claim 3 wherein the aqueous ammoniacal solution comprises an aqueous solution of ammonia and ammonium carbonate.

* * * * *